United States Patent [19]

Sanford

[11] 4,287,921
[45] Sep. 8, 1981

[54] CANISTER SET

[76] Inventor: Robert B. Sanford, 7605 Walton La., Annandale, Va. 22003

[21] Appl. No.: 45,787

[22] Filed: Jun. 5, 1979

[51] Int. Cl.³ .................................................. B65B 1/04
[52] U.S. Cl. ...................................... 141/360; 222/181; 222/450; 141/286
[58] Field of Search .............................. 141/351–362, 141/286; 222/448, 449, 450, 181, 233, 235, 447

[56] References Cited

U.S. PATENT DOCUMENTS

| 162,734 | 4/1875 | Ziegel | 222/449 |
| 3,361,299 | 1/1968 | Peterson | 222/450 |
| 3,650,439 | 3/1972 | Shimooka | 222/450 |

Primary Examiner—Houston S. Bell, Jr.
Attorney, Agent, or Firm—B. P. Fishburne, Jr.

[57] ABSTRACT

A canister set for dispensing measured amounts of flowable solids has a common support. Each canister of the set has a removable trap chamber for residue solids which may be cleaned out at intervals. The trap chamber of each canister is engaged by a receiver vessel and shifted to a material dispensing position. A mechanism on each canister is engaged and activated by the movable trap chamber to shift a closure slide at the bottom of a material measuring chamber to an open dispensing position where the flowable solids can gravitate into the receiver vessel. Substantially simultaneously an upper closure for the measuring chamber cuts off the flow of material thereto from an overhead storage hopper during the dispensing operation. A spring automatically returns each trap chamber and associated mechanism to its normal position.

4 Claims, 18 Drawing Figures

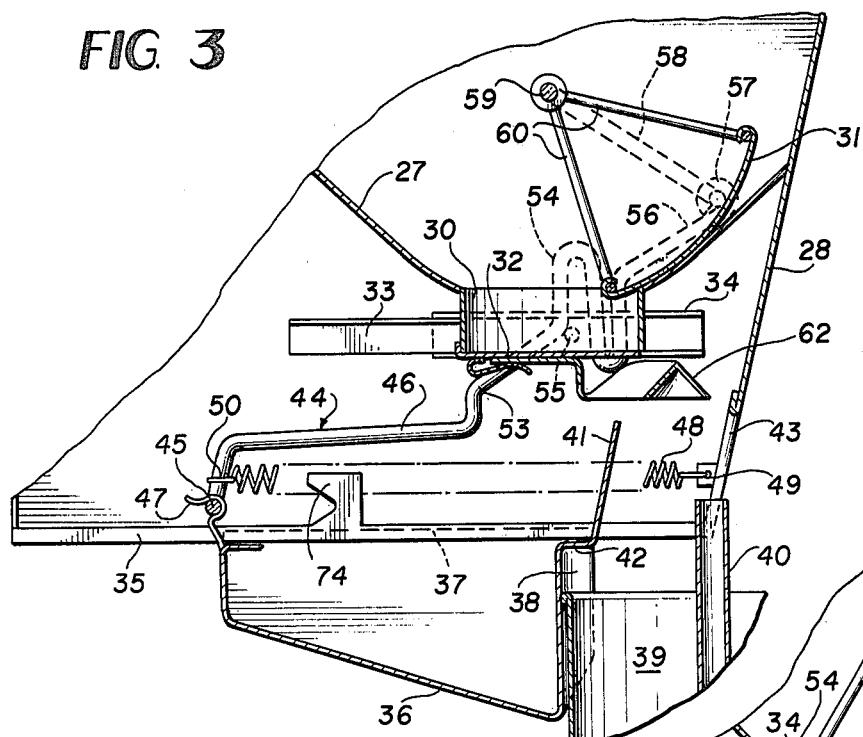

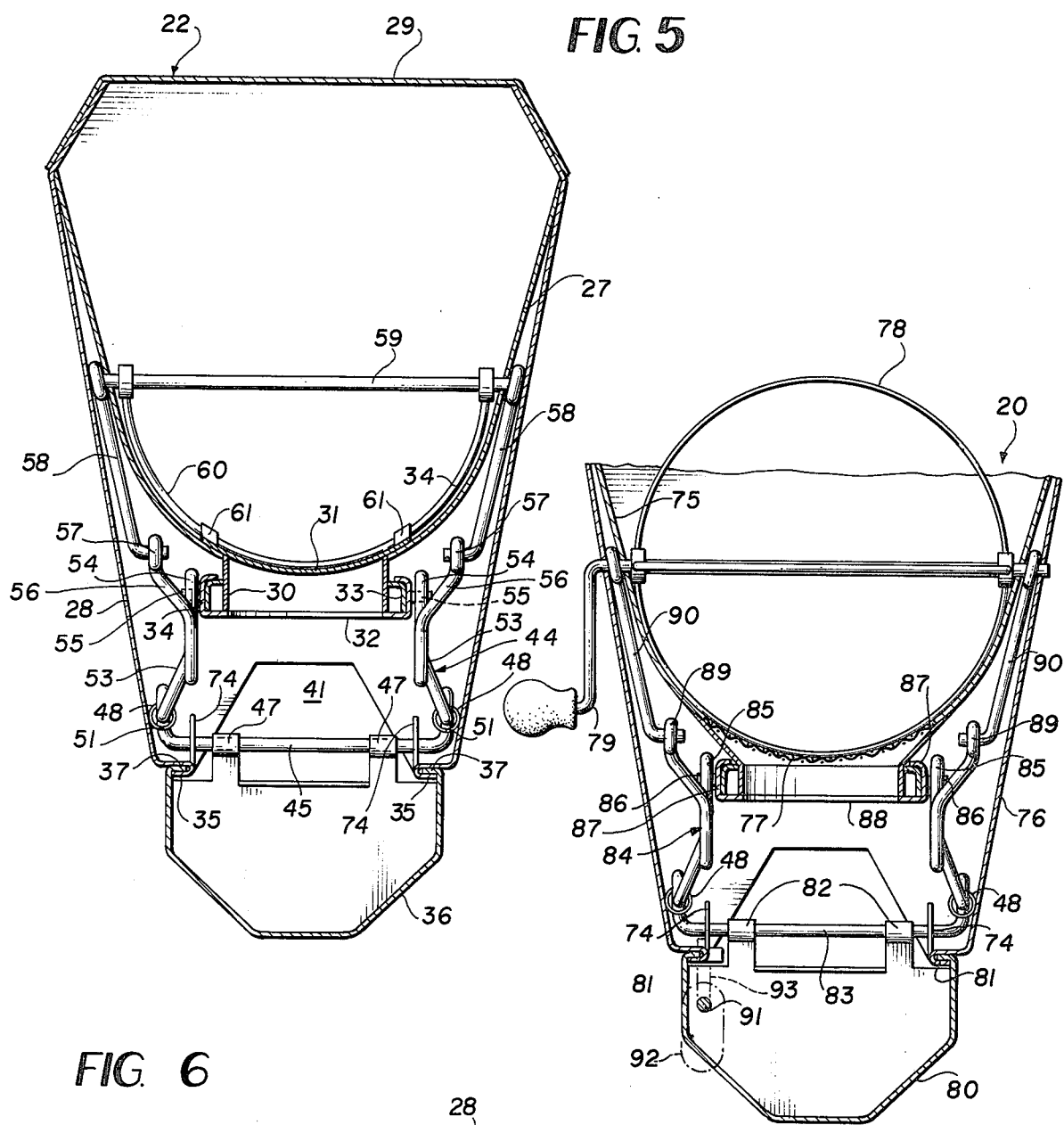
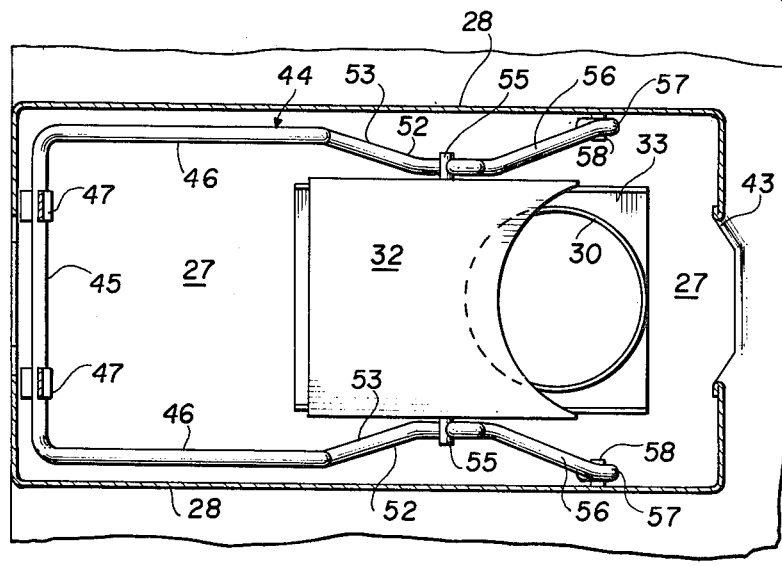

CANISTER SET

BACKGROUND OF THE INVENTION

A variety of types of canisters and canister sets for kitchen use are known in the prior art. Expired U.S. Pat. Nos. 470,018 and 634,634 disclose canisters for flowable solids which deliver measured quantities through suitable outlets into containers. The objective of this invention is to significantly improve on the known prior art devices in terms of convenience of use for the housewife, accurate dispensing of measured amounts of flowables, and substantially the complete elimination of waste of the flowables being dispensed with the added benefit of a cleaner countertop in the region of the canister set.

A further object of the invention is to eliminate the customary need for separate sifters and lump breakers by integrating these devices in the various canisters of the set where such operations are required for a smooth and efficient dispensing of measured quantities of flowables. The accomplishment of these and other objectives will become readily apparent to those skilled in the art during the course of the following description.

BRIEF DESCRIPTION OF THE DRAWINGS

FIG. 1 is a perspective view of a canister set according to the invention.

FIG. 2 is a central vertical section in the front-to-back plane taken on line 2—2 of FIG. 1 and showing a typical operating mechanism arranged in a normal non-dispensing mode.

FIG. 3 is a fragmentary view, similar to FIG. 2, showing the dispensing mechanism in an intermediate mode.

FIG. 4 is a further view, similar to FIG. 2, showing the same mechanism in a dispensing mode.

FIG. 5 is a transverse vertical section taken on line 5—5 of FIG. 4.

FIG. 6 is a horizontal section taken on line 6—6 of FIG. 4.

FIG. 7 is a fragmentary vertical section showing a variant of the invention in FIGS. 1 to 6.

FIG. 8 is an exploded perspective view of the variant.

FIG. 9 is a bottom plan view of a second variant of the invention in FIGS. 1 to 6.

FIG. 10 is a view similar to FIG. 5 taken through another canister of the set for dispensing sifted flour or the like.

DETAILED DESCRIPTION OF THE PREFERRED EMBODIMENTS

Figures 1, 2:
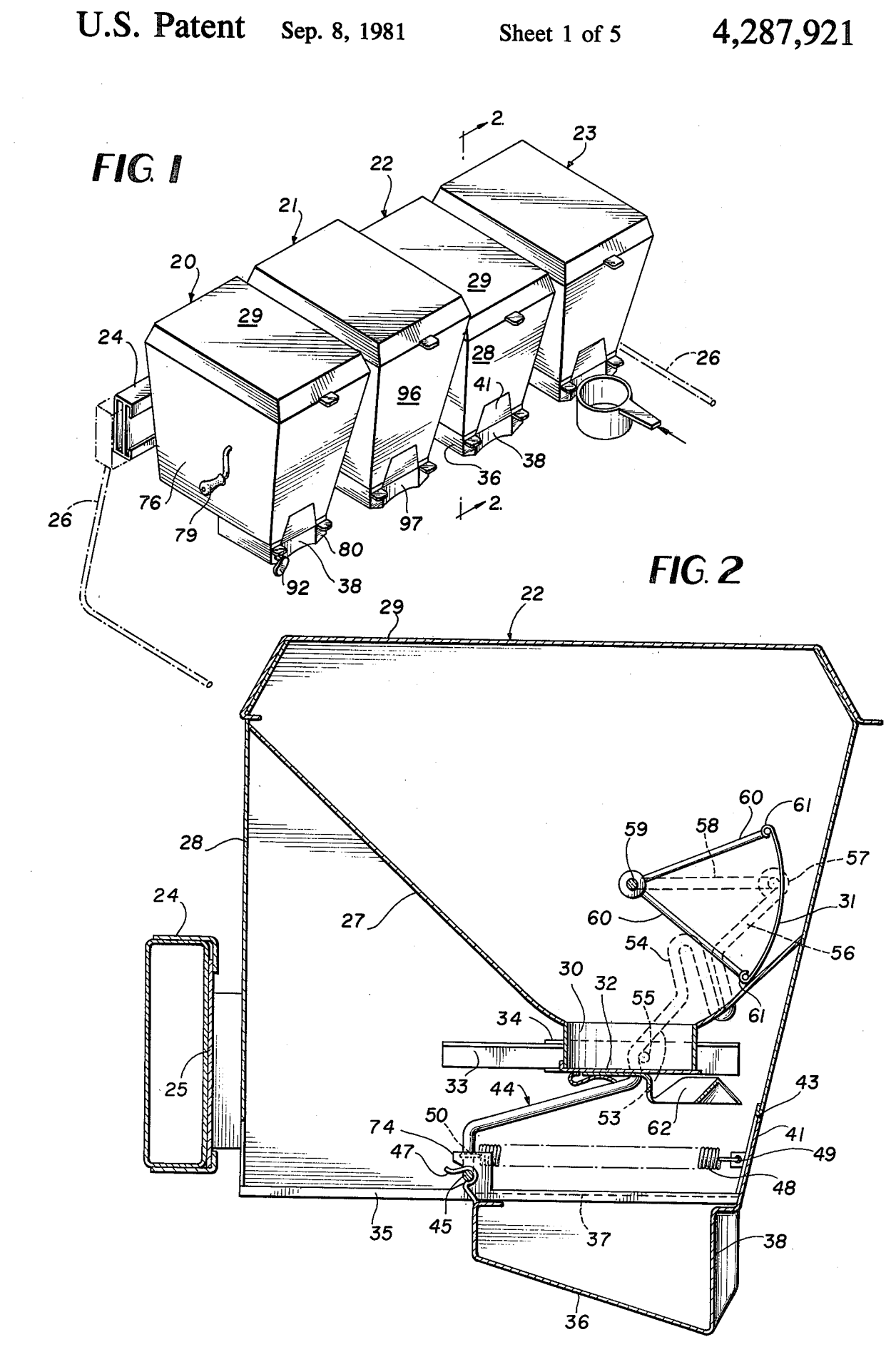
Figure 11:
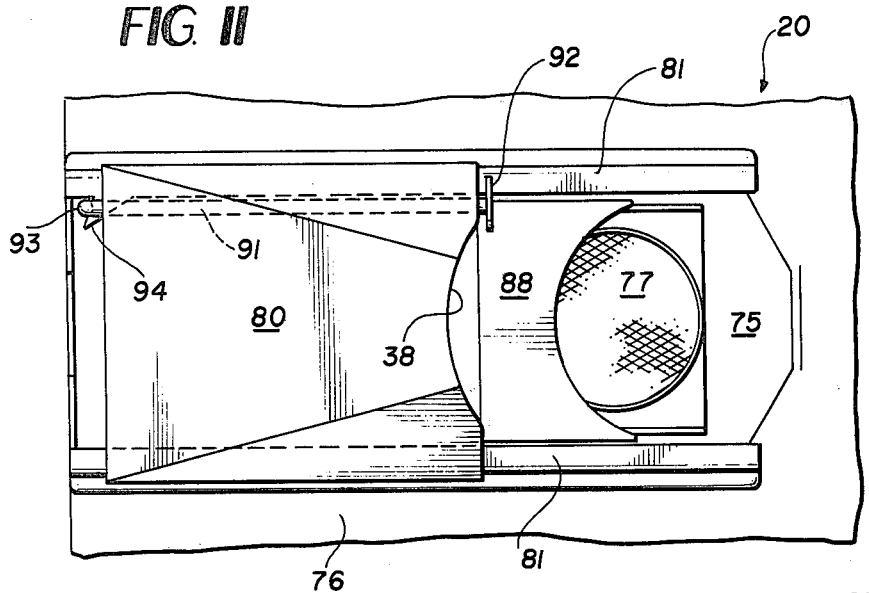
FIG. 11 is a fragmentary bottom plan view of the canister shown in FIG. 10 in the dispensing mode and showing a latch means to allow continuous dispensing.

Referring to the drawings in detail wherein like numerals designate like parts, FIG. 1 illustrates a canister set in accordance with the invention in which canisters 20, 21, 22 and 23 for flour, sugar, coffee and tea, or like flowable solids are supported on a common horizontal support rail 24 through individual support brackets 25 carried by the several canisters and being slidably engaged with the support rail for ease of lateral adjustment and separation, when required. The support rail 24 may be secured fixedly to a vertical wall at a proper elevation above a kitchen countertop, or may be mounted on a portable stand having legs 26 as shown in broken lines in FIG. 1.

The details of coffee canister 22 are depicted in FIGS. 2 through 6 of the drawings, and it is to be understood that this canister can be used with other flowable solids which require dispensing in accurately measured amounts.

Referring primarily to FIGS. 2 through 6, the coffee canister 22 has a hopper body 27 suitably fixed inside of an outer shell 28 which carries the mounting bracket 25 on its back wall. The hopper body has a removable lid 29. At its bottom, the downwardly tapering hopper body 27 includes a fixed vertical axis cylindrical material measuring chamber 30 adapted to have its normally open top covered at proper times by an arcuate cut-off or gate valve 31 shown fully open in FIG. 2 and fully closed in FIG. 4. The bottom open end of measuring chamber 30 is normally closed as in FIG. 2 by a horizontal sliding gate 32 or valve shown fully closed in FIG. 2 and fully open in FIG. 4. It can be seen in FIGS. 2 and 4 that the top gate 31 is fully open and the bottom gate 32 is fully closed and vice-versa. FIG. 3 shows the intermediate positions of the two gates or valves 31 and 32.

An inverted horizontal front-to-back extending channel member 33 forming a guide or track is fixed near and below the bottom of hopper body 27 preferably by securing it firmly to the cylindrical wall of measuring chamber 30. The horizontall sliding closure gate 32 for the bottom of chamber 30 has side parallel longitudinal guide flanges 34 which slidably embrace the opposite sides of channel or track 33.

The outer shell 28 of canister 22 extends below the bottom of hopper body 27, FIGS. 2 and 5, and terminates in a pair of spaced parallel front-to-back extending horizontal channel tracks 35, the bottom of shell 28 being open between these channel tracks. A trap chamber 36 for coffee or other solid material residue has top spaced parallel suspension flanges 37 slidably engaging in the outwardly opening channel tracks 35. The trap chamber 36 in its normal spring-biased position beneath the measuring chamber 30, FIG. 2, completely covers the open bottom of the shell 28 in that region and serves to capture any residue material falling from the hopper when the parts return to their normal positions in FIG. 2. The cup-like trap chamber 36 may be completely removed from the canister 22 by sliding it from the forward ends of the channel tracks 35, thus enabling the trap chamber to be emptied at proper intervals.

The trap chamber 36 has a frontal arcuate recess 38 therein to receive the cylindrical basket 39 of a conventional coffeemaker, FIGS. 3 and 4, having a center tube 40. The trap chamber 36 also has a front upstanding plate extension 41 above the recess 38 and forming therewith a horizontal shoulder 42 to assist in the positioning of the basket 39 or other receiver vessel. When the trap chamber 36 is in the normal position of FIG. 2, the plate extension 41 covers an opening 43 of like shape formed in the front wall of outer shell 28.

A simple mechanism is provided to coordinate the actions of the two gates 31 and 32 between their open and closed positions relative to the stationary chamber 30. This mechanism comprises a stiff wire bail 44 having a rear transverse bar 45 and parallel forwardly extending arms 46. Hook-like elements 47 rising from the rear end of trap chamber 36 embrace the transverse bar 45 so that rearward displacement of the trap chamber 36 in response to pressure against it exerted by the basket 39 will force the bail 44 rearwardly horizontally toward the dispensing position shown in FIG. 4 and through the intermediate position of FIG. 3. The bail 44 and trap chamber 36 are biased to the position of FIG. 2 by the action of a pair of retractile springs 48 having their forward ends anchored at 49 to the forward wall of shell 28 and their rear ends attached at 50 to short rising sections 51 of the bail between the bar 45 and arms 46.

Ahead of the parallel arms 46, the two sides of the bail 44 are formed inwardly as at 52 in FIG. 6 and are inclined upwardly as at 53, FIG. 4, and are further formed intermediate their ends to provide a pair of vertical inverted U-loops 54 adapted to receive laterally projecting drive pins 55 on opposite sides of the sliding flanges 34. As will be further described, the loops 54 provide lost motion connections with the pins 55 whereby the sliding gate 34 will not begin to uncover the measuring chamber 30 until the upper material cut-off gate 31 is closed.

Forwardly and upwardly of the loops 54, the two sides of the bail 44 further include divergent arms 56 having eyes 57 at their ends pivotally connected with driving crank arms 58 which lie close to the side walls of the outer shell 28, FIG. 5. These crank arms 58 are rigidly connected with the ends of a transverse rocker shaft 59 journaled on the side walls of hopper body 27. Rigidly connected with the rocker shaft 59 just inwardly of the hopper walls are arcuate drive arms 60 extending radially of the shaft 59 and secured to the fore and aft ends of the material cut-off gate 31 which is spherically curved to mate with the curved wall of the hopper body 27 adjacent to the top of measuring chamber 30, FIG. 5. The gate 31 carries cleats or knuckles 61 which are curled around the respective drive arms 60.

Clipped to the bottom of horizontally sliding gate 32 detachably and moving therewith is a deflector 62 for material released from the chamber 30 for entry into the receiver 39, FIG. 4. At the time of such material dispensing, the deflector 62 is directly over the tube 40 of the coffeemaker and deflects the coffee outwardly of the tube. If a different type of receiver is being used, the deflector 62 may be removed and set aside.

To convert the coffee canister 22 to a dispenser of lesser amounts of coffee for known purposes, an adapter or insert 63 having inner and outer concentric walls 64 and 65 and a top wall 66 is provided. This insert can be telescoped inside of the cylindrical measuring chamber wall 30, FIGS. 7 and 8, and held therein by an L-slot 67 and coacting pin 68. The space 69, FIG. 7, inside of the wall 64 forms a reduced size measuring chamber for coffee, instant coffee, or other flowable solid. The lower slide gate 32 functions in exactly the same manner for covering and uncovering the smaller chamber 69 as it does in relation to the larger chamber 30.

FIG. 9 shows another variant of the invention in FIGS. 2 to 6 in which an insert 70, similar to the insert 63, is provided with an adjustable size measuring chamber 71 by virtue of a sliding wall 72 arranged between parallel guide walls 73 in the insert. Such adjustable chamber arrangement could, if desired, be constructed within the permanent larger chamber wall 30.

In the operation of the invention shown in FIGS. 2 through 6, the user positions the coffee receiver 39 in the frontal recess or seat 38 of trap chamber 36 and forces the trap chamber toward its full rearward position of FIG. 4 and through and beyond the intermediate position of FIG. 3. During this activity, the hooks 47 on the rear of trap chamber 36 force the transverse bar 45 of the bail 44 rearwardly from the position in FIG. 2 where the gate 32 is fully closed and the gate 31 is fully open. When the mechanism reaches the intermediate position shown in FIG. 3, the upper gate 31 is beginning to move toward the closed or shut-off position for measuring chamber 30 under influence of the bail 44 but there is no movement of the lower gate 32 because the pins 55 carried by the lower gate are merely slidably engaged beneath the inclined sections 53 of the bail, FIGS. 2 and 4. There is thus a lost motion connection between the bail 44 and the lower gate 32 while the mechanism is moving between the positions of FIGS. 2 and 3.

Further movement of the mechanism to the final dispensing position of FIG. 4 causes the bail arms 56 and their eyes 57 to pull the crank arms 58 downwardly or clockwise so that the upper gate 31 is fully closed and shuts off the flow of material between hopper 27 and measuring chamber 30. However, during this final movement of the bail 44 and gate 31 under pressure of the receiver 39, there still is no movement of the lower sliding gate 32 toward the open dispensing position of FIG. 4 until the inverted U-loops 54 are moved downwardly due to the swinging of crank arms 58. When such downward movement occurs, the loops 54 will straddle and engage the pins 55 and will finally, through these pins, force the lower sliding gate 32 to move rearwardly to the open dispensing position. Prior to this, the upper gate 32 will have fully closed above the chamber 30 so that a proper measured amount of material will be dispensed to the receiver 39. Thus, there is a second lost motion interval in the movement of the bail 44, namely, during the interval when the drive loops 54 are coming into engagement with the pins 55. The mechanism is simple, reliable, inexpensive and quite precise in its operation.

It should be noted that a pair of forward limit stops 74 for the transverse bar 45 of the bail 44 extend upwardly from the two channel tracks 35, FIGS. 4 and 5. When the receiver 39 is removed from contact with the trap chamber 36, the springs 48 automatically return the parts to their relative positions shown in FIG. 2 with the lower gate 32 closed and the upper gate 31 open so that the measuring chamber 30 receives a new charge of material. At this time, the bar 45 is stabilized by the stops 74. As previously described, the trap chamber 36 may be slid forwardly on the rails 35 and removed for emptying any residue material collected therein.

The canister 20 for flour and the like is shown in some detail in FIGS. 10 and 11. In these figures, a downwardly tapered hopper body 75 is held within an outer shell 76 in the manner previously described for the coffee dispenser 22. In lieu of the upper gate 31, which is not required, the bottom of the hopper body 75 is equipped with a spherically curved sifting screen panel 77, above which is mounted a multi-arm sifting rotor 78 having a turning crank handle 79 so that flour in the hopper body can be suitably agitated and sifted.

A removable trap chamber 80 for residue flour, substantially identical to the trap chamber 36, is held slidably on channel rails 81 at the bottom of shell 76. Hook elements 82 on the trap chamber 80 corresponding to the hook elements 47 engage the rear cross bar 83 of a bail 84 which is substantially similar to the bail 44. The bail 84 has drive loops 85 coacting with pins 86 carried by guide flanges 87 of a bottom horizontal slide gate 88 or closure corresponding in construction and purpose to the gate 32. As shown in FIG. 10, the eyes 89 of bail 84 are suspended on arms 90 pivoted to the transverse rotary shaft of sifting rotor 78. The mechanism for the slide gate 88 is substantially identical to that for the gate 32 except that the arms 58 in FIG. 5 are secured rigidly to rocker shaft 59, whereas the arms 90 are pivoted to the shaft of rotor 78. The difference resulting from this is that movement of the trap chamber 80 under force of a receiver does not induce rotation of the sifter rotor 78, and the latter is independently driven by the crank 79.

When flour is to be sifted and dispensed from the canister 20 into a suitable receiver, the receiver, not shown, is engaged with the recess 38 of removable trap chamber 80 and the latter is forced back to the dispensing position shown in FIG. 11 where the gate 88 has uncovered the screen 77. So that sifting and dispensing in a continuous mode for a required time can take place, a latching means for the trap chamber 80 and gate 88 is provided. This means comprises a rotary latch bar 91 having a counterweighted forward handle 92, and a rear transverse latch extension 93 adapted to be engaged with a stationary detent 94 near the rear of the outer shell 76. By this arrangement, the parts may be held in the dispensing mode while the sifting crank handle 79 is turned for the desired period of time. When the latch is released, and the receiver vessel is removed, the springs 48 will return the parts to their normal positions where the gate 88 is in covering relationship to the screen 77.

Figure 12:
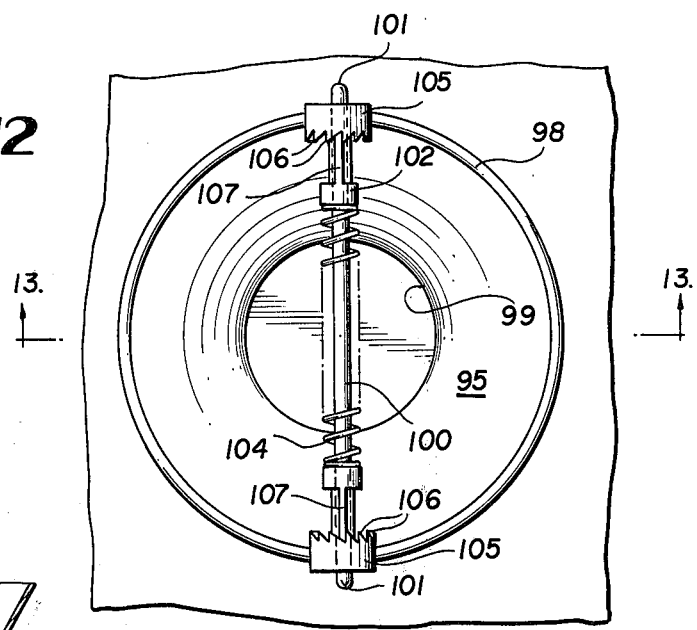
FIG. 12 is a fragmentary plan view of a canister for sugar having a ratchet lump or clod disintegrator.
Figure 13:
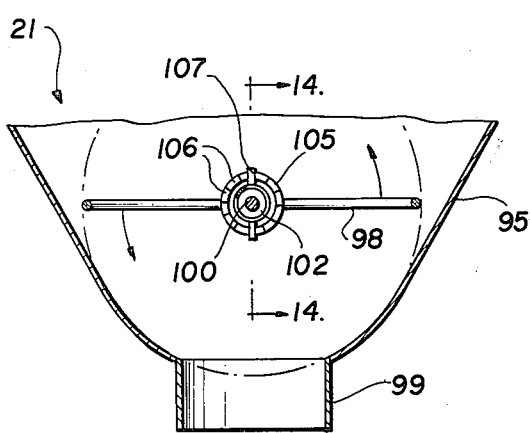
FIG. 13 is a transverse vertical section taken on line 13—13 of FIG. 12.
Figure 14:
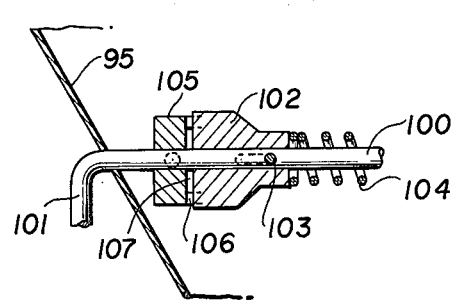
FIG. 14 is an enlarged fragmentary vertical section taken on line 14—14 of FIG. 13.

FIGS. 12 through 14 show details of the canister 21 for sugar or any like material subject to lumping due to dampness. The basic construction of the hopper body 95, the outer shell 96, FIG. 1, removable trap chamber 97 and associated mechanism are substantially identical to the corresponding elements already described in connection with the canisters 20 and 22, and this description need not be repeated. The sugar canister 21, however, includes a unique lump breaking or disintegrating feature shown in FIGS. 12 to 14. This feature comprises a substantially circular rotor 98 positioned in the lower part of hopper body 95 immediately above the hopper discharge extension 99. The lump breaking rotor 98 is mounted through a one-way active clutch or ratchet mechanism on a cross shaft 100 which is positively driven by displacement of the trap chamber 97 in the same manner described above relative to the canisters 20 and 22. Substantially the identical driving mechanism including the bail 44 and associated elements, not shown in FIGS. 12 to 14, are utilized to operate crank arms 101 of the cross shaft 100 in the way that the rocker shaft 59 of the coffee canister 22 is operated.

In the sugar canister 21, however, the mentioned clutch or ratchet mechanism comprises the following. Driving clutch heads 102 pinned to the shaft 100 at 103 are urged outwardly by a compression spring 104 toward engagement with opposing clutch heads 105 forming parts of the rotor 98 and turning therewith in one direction relative to the shaft 100. The clutch heads 105 have ratchet teeth 106 thereon sloping in one direction and coacting with single teeth 107 of the driving clutch heads 102. The arrangement is such that, when the trap chamber 97, FIG. 1, is forced inwardly by a receiver, the resulting rotation in one direction of the shaft 100 and clutch heads 102 thereon will positively drive the clutch heads 105 of rotor 98, so that lumps of material in the hopper 95 are broken up to permit proper dispensing through the outlet 99. When the receiver vessel is removed from the trap chamber 97 and the return springs 48 force the trap chamber and associated mechanism including shaft 100 and clutch heads 102 to turn in the reverse direction, the teeth 107 are able to trip over the slant teeth 106 and clutch heads 105 on rotor 98, should this rotor be stuck and unable to move because of a large lump of sugar. Thus, the one-way active and one-way releasing ratchet clutch enables the trap chamber 97 and associated parts to return to the normal position under all circumstances. Otherwise, the sugar canister 21 is basically constructed like the previously-described canister units.

The canister 23 for tea or another flowable substance is basically constructed and operates like the coffee canister 22 and need not be described in detail. In this connection, the canister set may have any practical number of separate canisters on the mounting rail 24 for dispensing different flowables in accordance with the construction of the canister 22 which has been described in full detail.

In FIGS. 15 through 18, a modified form of the structure described in FIGS. 1 through 6 is depicted. Referring to these figures, a canister 108 includes a mounting bracket 109 similar to the bracket 25 and being suitably attached to an outer shell 110 containing an internal hopper body 111 having a bottom measuring and outlet chamber 112 similar to the chamber 30. An upper material flow cut-off gate 113 similar to the gate 31 is provided and swings at proper times on the axis of a rocker shaft 114 corresponding to the shaft 59 of the previous embodiment. A coacting horizontal lower slide gate 115 corresponding to the gate 32 is guided in its movement by a fixed guide rail means 116 similar to the means 33.

At the bottom of shell 110, a trap chamber 117 corresponding to the trap chamber 36 receives residue material during the operation of the canister and prevents the residue from soiling the surrounding kitchen area. The basic use or operation of the modified canister 108 is the same as described in connection with the canister 22. However, the specific construction of mechanism and mode of operation is different in the following respects.

The trap chamber 117 is not slidable horizontally fore and aft on guide rails like the trap chamber 36. Instead the trap chamber 117 is swingable through an arc in a vertical plane between the fully closed and retracted position of FIG. 15 and the dispensing position in FIG. 17, and through the intermediate position of FIG. 16. The net results in terms of measuring the dispensing a prescribed volume of material from the chamber 112 are the same as in the prior embodiment.

Figure 15:
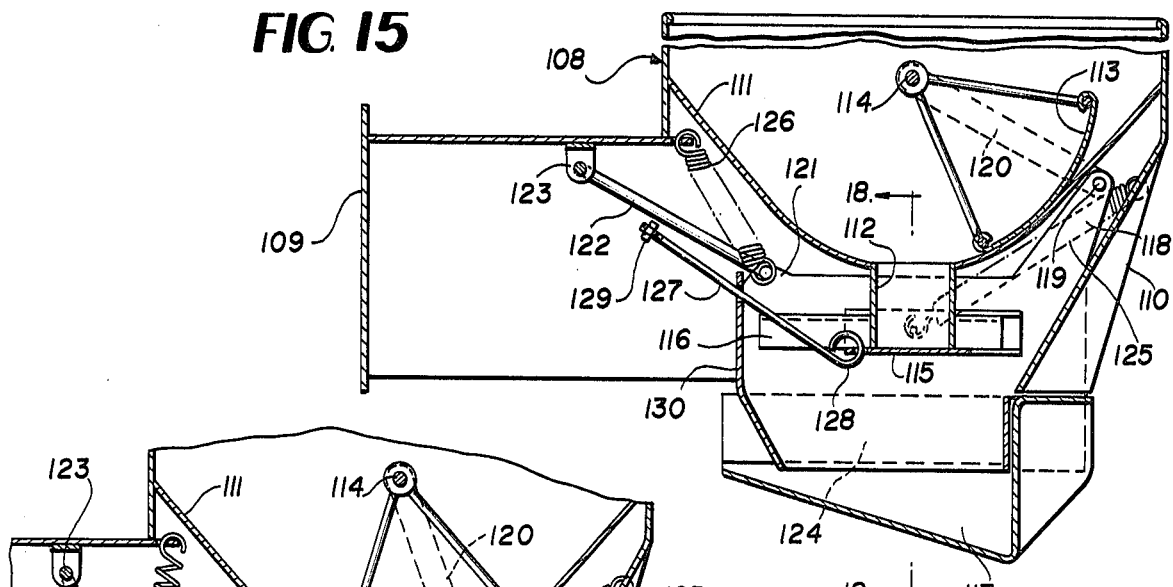
FIG. 15 is a view similar to FIG. 1 in vertical cross section showing a modification of the invention.
Figure 16:
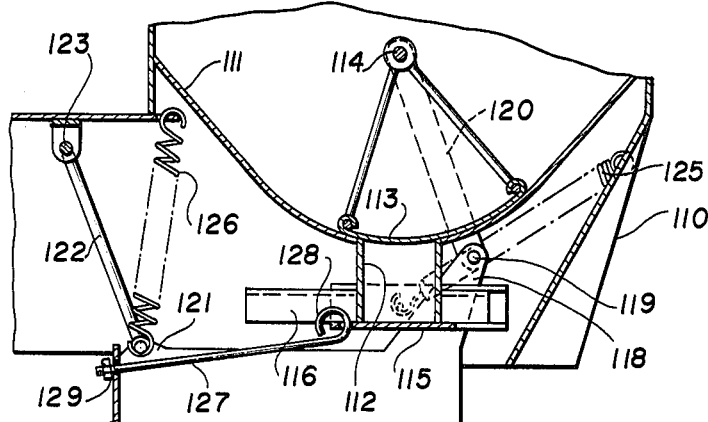
FIG. 16 is a similar view of the modification corresponding to the intermediate operational mode in FIG. 3.
Figure 17:
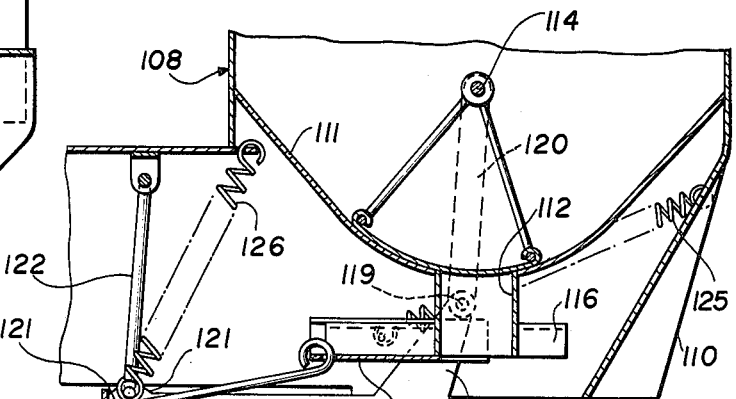
FIG. 17 is a similar view corresponding to the operational mode in FIG. 4.
Figure 18:
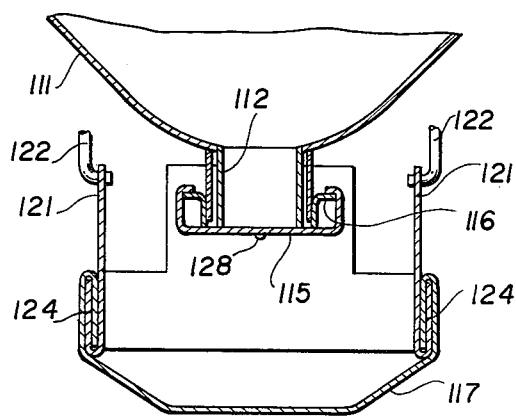
FIG. 18 is a fragmentary transverse vertical section taken on line 18—18 of FIG. 15.

The trap chamber 117, when closed, FIG. 15, is in abutment with the outer shell 110. At its top and forward side, it has rising suspension arms 118 on opposite sides thereof pivotally connected at 119 with crank arms 120 corresponding to the arms 58 and operating in the same manner to drive the upper gate 113. The rearward side of trap chamber 117 has suspension ears 121 thereon pivotally coupled with rear swingable links 122 which are in turn pivoted at 123 to the bracket structure 109. The links 122 and crank arms 120 form a parallelogram suspension linkage for the trap chamber during its movement to and from the positions shown in the drawings. In its swinging movement path, the trap chamber is level at all times. The lower cup-like body of trap chamber 117 is removable for emptying at desired times by virtue of a horizontal slide joint 124 at each side thereof and shown particularly in FIG. 18.

Forward and rear springs 125 and 126 bias the trap chamber to its closed position of FIG. 15 and thus bias the gates 113 and 115 to their respective positions in this figure. The springs yield and stretch to allow the trap chamber to swing to the dispensing position of FIG. 17. A control link 127 pivotally connected to an eye 128 with the slide gate 115 serves to retract this slide gate to the dispensing position shown in FIG. 17. The link 127, which has an adjustable stop nut 129 on its rear end, has a lost motion connection with the rear wall 130 of the trap chamber by virtue of an opening for the link 127 formed in the rear wall 130. This makes possible the same coordinated and properly timed closing and opening of the gates 113 and 115 described for the corresponding gates 31 and 32 of the prior embodiment. That is to say, when the trap chamber 117 is engaged by a receiver vessel and thrust rearwardly toward the dispensing position, the initial lost motion sliding of the control link 127 through the opening in the trap chamber back wall 130 allows the lower gate 115 to remain closed, FIG. 16, while the upper gate 113 moves to its shut-off position. Following this, however, and during continued movement of the trap chamber 117 toward the dispensing position, the lost motion through the link 127 ceases because the stop nut 129 engages the back wall 130, following which the link 127 begins to pull the gate 115 to the open dispensing position. The operational advantages of the arrangement in FIGS. 15 to 18 are basically identical with those of the prior embodiment.

It should now be clear to those skilled in the art that the invention satisfies the need for a more convenient and more useful canister set which eliminates wasting of ingredients and substantially eliminates soiling the kitchen counter and surrounding areas. More importantly, the canister set includes means to measure precise amounts for accurate dispensing and includes components which eliminate the need for separate devices, such as a flour sifter. All of these features are included in a canister set which is reasonably economical to manufacture and is entirely practical to operate. The feature of the easily removable trap chamber for residue solids is very convenient and sanitary.

It is to be understood that the forms of the invention herewith shown and described are to be taken as preferred examples of the same, and that various changes in shapes, sizes and arrangements of parts may be resorted to, without departing from the spirit of the invention or scope of the subjoined claims.

I claim:

1. A dispensing canister for flowable solids comprising a hopper body and supporting means therefor, a measuring chamber at the bottom of the hopper body and receiving with the assistance of gravity flowable solids from the hopper body, upper and lower movable closure gates for the top and bottom of said measuring chamber, the upper closure gate being arcuate and having horizontal axis rotational support means, the lower closure gate being flat and horizontally movable and having linear horizontal guide means on opposite sides of the measuring chamber, crank arms for driving the upper closure gate attached to said rotational support means, drive elements for the lower closure gate fixed to opposite sides of the lower closure gate, an approximately U-shaped bail having spaced arms straddling the upper and lower closure gates and measuring chamber, corresponding ends of said arms being drivingly connected to said crank arms, intermediate portions of said arms being formed to provide lost motion loops therein and said drive elements being engaged movably within said lost motion loops, a spring means connected with said bail and biasing it toward a position which opens the upper closure gate and closes the lower closure gate, the bail including a driving crossbar, and a trap chamber having linear movement guided engagement with the bottom of the hopper body on a path of movement parallel to the movement of the lower closure gate and including pusher elements drivingly engaged with said crossbar, said trap chamber having a recessed front wall for ready engagement by a receptacle receiving flowable solids, and the trap chamber being bodily separable from the hopper body for emptying.

2. A dispensing canister for flowable solids as defined in claim 1, and a deflector element removably secured to the lower closure gate and moving therewith in response to movement of said bail by said trap chamber and being centrally disposed at the bottom of said measuring chamber when said lower closure gate is in the open position and the upper closure gate is closed.

3. A dispensing canister for flowable solids as defined in claim 1, and a support bracket on the rear of said hopper body engageable detachably with a common support for a plurality of like dispensing canisters.

4. A dispensing canister for flowable solids as defined in claim 3, and a common horizontal support rail for a plurality of like dispensing canisters each having said support bracket, said support rail having upper and lower opposing slots extending for its full length, the upper slot being vertically deeper than the lower slot, and the support bracket of each canister including a vertical plate engageable slidably and adjustably in said opposing slots and being removable from said rail by lifting the vertical plate to the top of the upper slot whereby the lower edge of the plate will clear the lower slot.

* * * * *